United States Patent [19]
Ebner et al.

[11] Patent Number: 4,607,917
[45] Date of Patent: Aug. 26, 1986

[54] ELECTRO-OPTICAL DEVICE

[75] Inventors: Heinz Ebner, Ditzingen; Gabriele I. Koch, Stuttgart; Joachim Lauckner, Korntal; Felix Lutz, Stuttgart; Gerhard Seibold, Remseck; Gerhard Wessel, Stuttgart, all of Fed. Rep. of Germany

[73] Assignee: International Standard Electric Corporation, New York, N.Y.

[21] Appl. No.: 486,574

[22] Filed: Apr. 19, 1983

[30] Foreign Application Priority Data

Apr. 20, 1982 [DE] Fed. Rep. of Germany ....... 3214584

[51] Int. Cl.$^4$ ................................................ G02F 1/07
[52] U.S. Cl. ...................................... 350/392; 350/356
[58] Field of Search ............... 350/355, 356, 389, 390, 350/392, 393

[56] References Cited

U.S. PATENT DOCUMENTS 3,901,584  8/1975  Yamazaki ............................. 350/392
3,944,330  3/1976  Tsunoda et al. ..................... 350/393

Primary Examiner—Bruce Y. Arnold
Attorney, Agent, or Firm—T. L. Peterson; J. M. May

[57] ABSTRACT

The disclosed invention relates to an electro-optical device for use with a facsimile printer, telecopier, etc., designed to accommodate line-at-a-time output of picture information with the aid of an electrically controllable electro-optical substrate made from a transparent electro-optical material, with the optical effect being controlled by applying a voltage between two control electrode arranged next to each other on the substrate. According to a preferred embodiment of the invention, within the area (4) of the substrate (1) to be controlled, and in addition to the control electrodes (2,3), there is provided at least one additional electrode (7) which may be common to several such areas (4), with each area (4) to be controlled having a corresponding opening (8) in the additional electrode (7) and the two control electrodes (2, 3) being spaced apart from each other on one side of the substrate (1) and the one or more additional electrodes (7) being arranged on the opposite side of the substrate. By applying a suitable voltage to the additional electrode (7), the electro-optical effect of the substrate can be varied within the areas (4) independently of the control (switching) voltage applied to the control electrodes (2, 3). Thus, various grey values can be provided; alternatively, a particular substrate (1) can be matched or adapted to one from another production batch and the control voltages can be kept to minimal levels.

5 Claims, 13 Drawing Figures

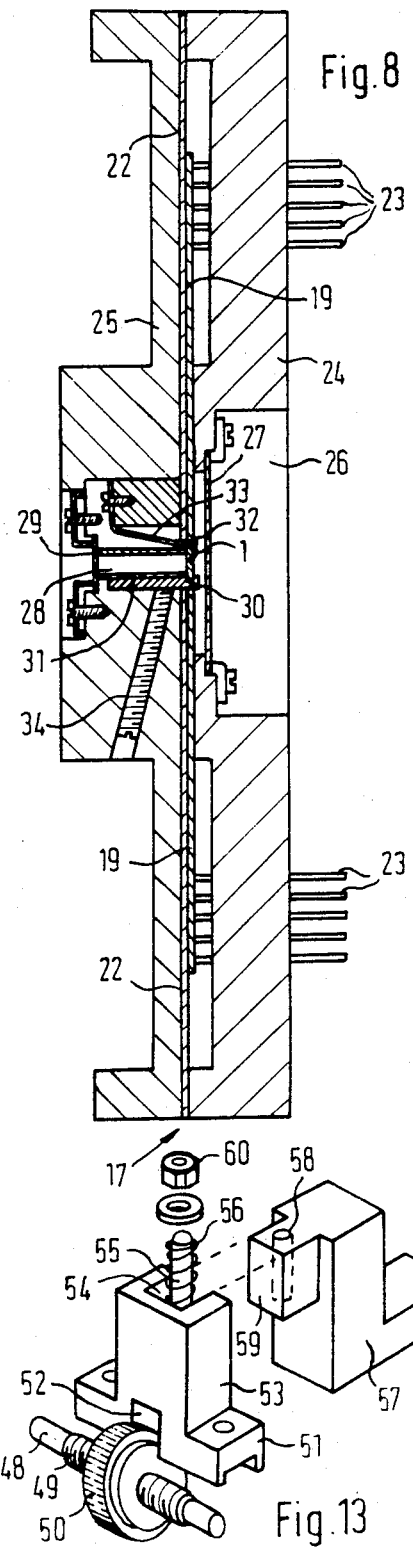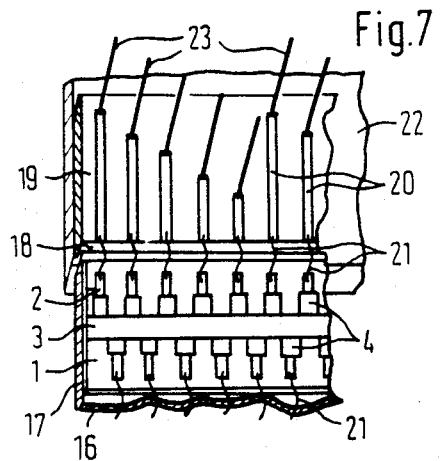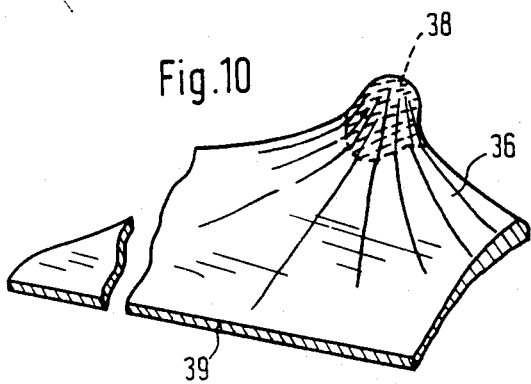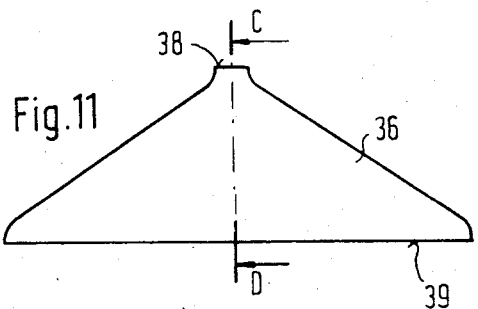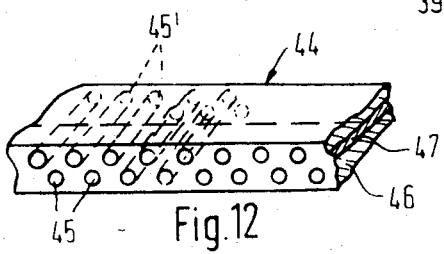

ELECTRO-OPTICAL DEVICE

FIELD OF THE INVENTION

The present invention relates to an electro-optical device especially for the line-at-a-time output of video information, and more particularly to such a device incorporating an electrically controllable electro-optical substrate made from a transparent electro-optical material with the optical effect being controlled by applying a voltage between control electrodes.

BACKGROUND ART

An electro-optical device incorporating an electrically controllable electro-optical substrate made from a transparent electro-optical material with the optical effect being controlled by applying a voltage between control electrodes is known from German published patent application DE-OS 25 57 254. In that device there is provided on the electro-optical substrate one electrode which is common to all picture points and connected to ground potential, and a plurality of control electrodes, one for each picture point and each capable of being connected to a voltage. In order to be able to achieve a particular electro-optical effect, a predetermined control voltage is required. However, the electro-optical effect is dependent on manufacturing parameters and it is not guaranteed in all cases that similar substrates from different production batches will produce the optimum or a predetermined maximum effect upon application of the same control voltage. Furthermore, as a practical matter, it can easily happen that the control voltage for achieving a certain electro-optical effect must be quite high, e.g., 200 V direct current voltage. Depending on the batch, however, it also happens that the control voltage might have to be adjusted higher or lower in order to achieve consistently the same electro-optical effects. Moreover, for a predetermined light intensity and duration of exposure, the control voltage has to be varied in order to achieve different grey stages.

BRIEF SUMMARY OF THE INVENTION

The invention, therefore, has as one of its overall objects to provide a practical solution to the problem of providing a control voltage having optimum characteristics and, if so required, of compensating for cases where adjacent substrates have variations in electro-optical properties.

According to the invention, this problem is solved by providing a third additional electrode separated from the two control electrodes, with the two control electrodes being arranged proximate each other on one side of the substrate and the additional electrode being provided for on the opposite side thereof. By arranging the additional electrode in this way, and upon application of an appropriate voltage potential thereto, the electro-optical effect can be influenced without the control voltage having to be changed. By the application of such an additional voltage potential, therefore, manufacturing tolerances affecting the substrates may be compensated for, various grey values may be achieved, and various light sources and/or light-sensitive layers can be accommodated.

DESCRIPTION OF THE FIGURES

Further advantageous details of the invention will now be described with reference to the exemplary embodiment shown in FIGS. 1 to 13 of the accompanying Drawing, in which:

FIG. 7 shows one possible arrangement of contacts to the substrate in a perspective view;

FIG. 8 shows on an enlarged scale a printing head incorporating the invention;

FIG. 10 shows the light-shape converter in a perspective representation;

FIG. 11 shows the light-shape converter of FIGS. 9 and 10 in a top view with the line C-D showing the orientation of the section shown in FIG. 9;

FIG. 12 shows a portion of the focusing unit of FIG. 9 in perspective; and

FIG. 13 shows a cross slide for the light-shape converter.

DESCRIPTION OF A PREFERRED EMBODIMENT

Figure 1:
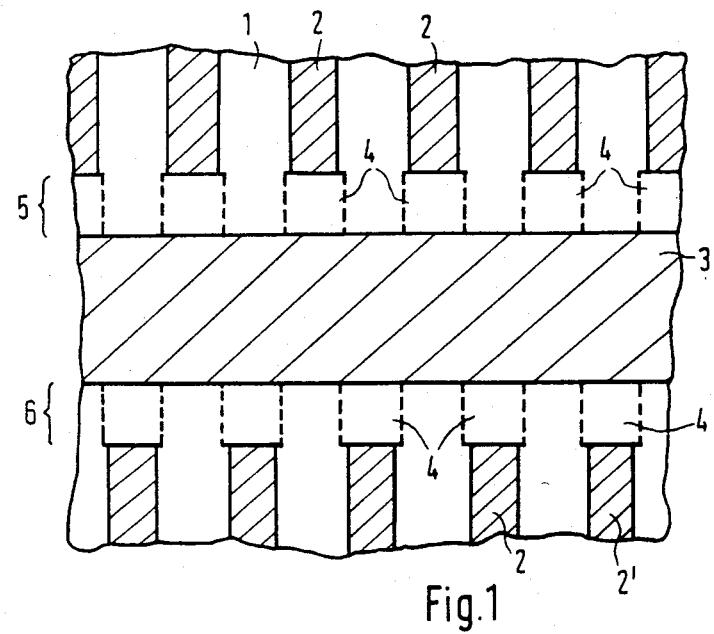
FIG. 1 shows part of a substrate employing electrodes according to the invention, as seen from above.

In FIG. 1, the reference numeral 1 indicates a substrate of electro-optical material whose optical properties can be changed within a predetermined active window area 4 by applying a voltage between two respective control electrodes 2 and 3 arranged at a defined spaced-apart relation with respect to each other. A well-known suitable material is transparent ceramic lead lanthanum zirconate titanate (PLZT) which, as is well-known, has double-refracting properties.

In the illustrated exemplary embodiment, there are provided a plurality of such active areas 4 arranged in two broken lines 5 and 6 which together, when projected onto the same line, will result in a single continuous line. The organization of the active areas into two broken lines 5, 6 permits the very fine subdivision of a line into very narrow points of light (each corresponding to an individual area 4), which nevertheless can be individually connected to an external control voltage without the widths of the control electrodes 2 having to be made very small. This arrangement provides a high degree of reliability against voltage flashovers from one control electrode 2 to a neighboring one, as well as a high current-carrying capacity. The second control electrode 3 is a strip-shaped central electrode which is common to all areas 4.

Figures 2, 3:
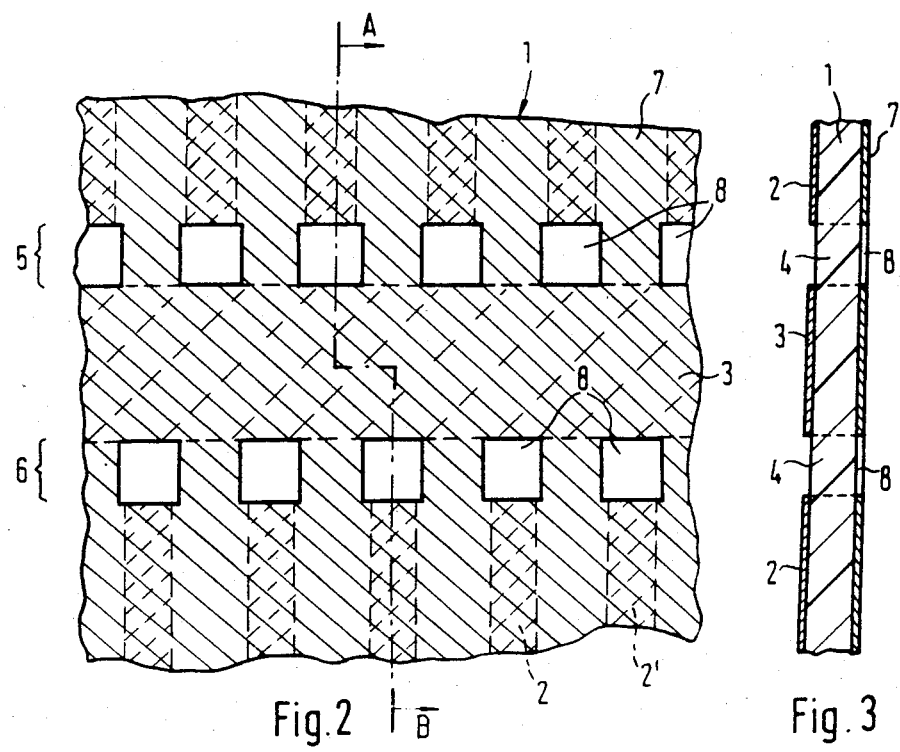
FIG. 2 shows the same as seen from below.
FIG. 3 is a sectional view taken on line A-B of FIG. 2.

According to the present invention, an additional electrode 7 is provided for on the side of the substrate 1 opposite the control electrodes 2, 3, with this additional electrode 7, in the embodiment illustrated in FIGS. 2 and 3, being a surface electrode common to all such areas 4 on a given substrate, with window-shaped openings 8 being provided therein, the shape and locations of the openings 8 corresponding to the areas 4 on the other side of the substrate 1.

The operation of the electro-optical device will now be explained with reference to FIGS. 4 through 6.

Figure 4:
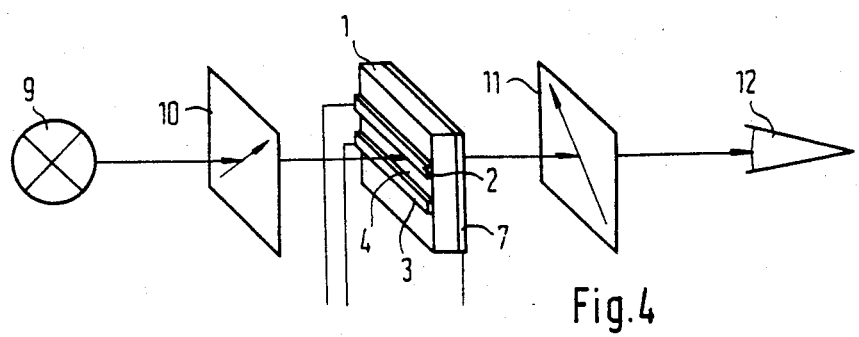
FIG. 4 is a schematical representation of such a substrate in use.

As shown schematically in FIG. 4, there is arranged a light source 9 followed by a first polarization filter 10, which in turn is followed by the electro-optical device 5 consisting of the substrate 1, the control electrodes 2, 3 and the additional electrode 7. (The openings 8 are not visible in this Figure.) Next there is arranged a second polarization filter 11 which, with respect to the first one, is rotated by 90° so that no light is permitted to pass under normal exposure conditions. Following the polarization filter 11, there is provided a radiation sensitive (in particular, a photosensitive) element 12. In the case of an electrostatic printer, this latter may be a carrier bearing a layer of selenium, cadmium or silicon which, if so required, may also be correspondingly doped.

If now the required control voltage, for example, a dc voltage of 200 V, is applied to the control electrodes 2, 3, the transmitted polarized light has its plane of polarization rotated so that it may pass through the second polarization filter 11, thereby exposing a corresponding point of the light-sensitive element 12.

Figure 5:
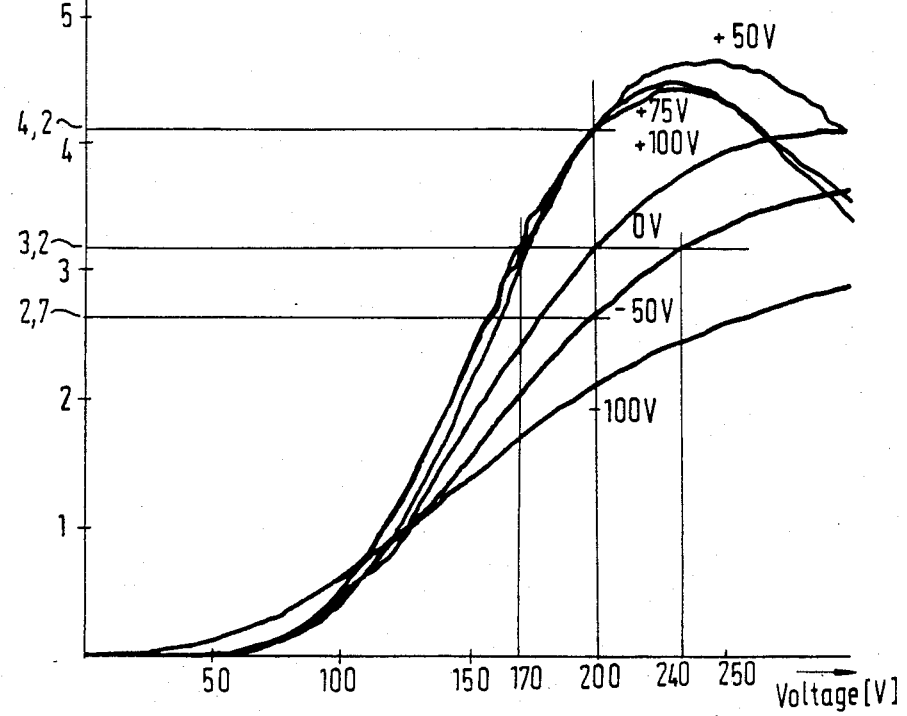
FIG. 5 is a graph showing the dependence of light intensity upon control voltage for different potentials at the additional electrode.

The transmittance at a constant light intensity is indicated in the diagram as shown in FIG. 5 with respect to a voltage of zero V at the additional electrode 7. If/now a bias voltage is applied to the additional electrode 7, the transmittance changes in accordance with the curves as shown. As can be seen, the light intensity at the receiver, that is, at the light-sensitive element 12, can thereby be varied within a relatively wide range, without the control voltage at the control electrodes 2, 3 having to be changed. Therefore, for the same output intensity, it is possible, for example, to lower the control voltage from 200 to 170 V if a dc voltage of +50 to +100 V is applied to the additional electrode 7. This means that the necessary control currents can be substantially reduced, and that also the danger of flashovers between two neighboring control electrodes 2, 2', (FIGS. 1 to 3) can be reduced; alternatively, these control electrodes, 2, 2' can be arranged closer to each other, thus resulting in a still finer subdivision of the individual picture elements or areas 4.

The application of a negative voltage to the additional electrode 7 reduces the intensity. Accordingly, it will be seen that an electro-optical device according to the invention can to a large extent be adapted to different existing requirements.

Figure 6:
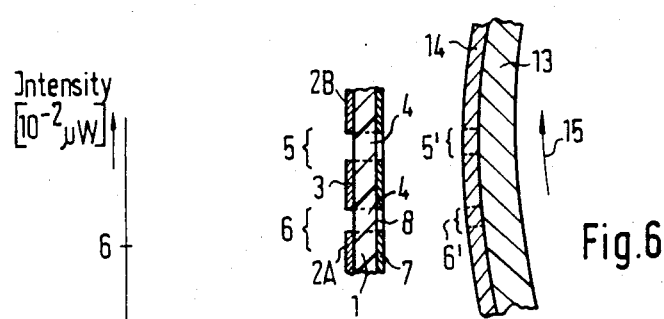
FIG. 6 is a side view showing part of a drum coated with a photoconductive layer.

With reference to FIG. 6, the mode of operation of the staggered areas 4 organized into two broken lines 5, 6 together corresponding to a single output line of light will now be described briefly. As the light-sensitive element 12, there is illustrated a section of a carrier drum 13 which is coated with a radiation-sensitive layer 14. The drum 13 is assumed to rotate in the direction as indicated by the arrow 15. In order to print a whole line, at first the individual areas 4 of the lower broken line 6 are activated by a short-lasting application of a control voltage to the lower control electrodes 2A and to the common control electrode 3, so that on the carrier drum 13, the layer 14 along one partial line 6' is exposed and, for example, discharged. Upon rotation of the carrier drum 13 in the direction as indicated by the arrow 15, the upper broken line 5 is activated when the previously exposed partial line 6' is positioned in front of the areas 4 of the upper broken line 5 by applying the control voltage at the proper time to the upper control electrodes 2B and the center electrode 3. As a result, a second partial line 5' is recorded in overlapping relationship to the partial line 6'. The two partial lines 5', 6' therefore are printed as one continuous line. Owing to the fact that no electrical connections are required to pass through the areas 4, the partial lines 5', 6' can be successively printed to obtain a single line having a very good resolution.

Preferably, the control electrodes 2 are oriented at right angles relative to the center electrode 3.

As is shown in FIG. 7, the substrate 1 is appropriately mounted on a transparent carrier 16 which is adjustably inserted in a suitable frame 17 (FIGS. 7 and 8). Along the longitudinal edges 18 of the carrier 16, there is provided on either side a circuit board 19 with printed conductors 20 facing the respective longitudinal edge 18. Each printed conductor 20 is connected to the opposite control electrode 2 by means of a thin electrical lead 21, such as gold wire bonded at either end. The circuit board 19, in turn, may be mounted to a carrier 22 likewise arranged in the frame 17. Alternatively, both the carrier 16 and the carrier 22 may be in the form of one common carrier. The conductors such as 20, serve as means for applying voltages between the various electrodes.

Preferably, the printed conductors 20 have various lengths with a predetermined number, for example five, of successively printed conductors 20 being successively shortened stepwise from a basic length. At the ends of the conductors 20 there preferably are provided respective terminal contacts 23, such as soldering terminals or plug-in contacts, which preferably project upwards from the circuit board 19.

FIG. 8 is a cross sectional view showing the arrangement of the FIG. 7 device within a frame 17. The frame 17, which in one practical embodiment, may have a width of about 15 centimeters and a length of about 40 centimeters, consists of two frame-like plate members 24 and 25 to form a frame, of which the member 24 (shown on the right) has a relatively large central opening 26 provided with a polarization filter 27 and, the member 25 (shown on the left) has a smaller, gaplike opening 28 provided with a second polarization filter 29 rotated by 90° relative to the first one. The plate members 24, 25 are secured to one another by appropriate means such as screws.

Within the frame, the position of the substrate 1 is adjustable in the direction of the substrate plane. To that end, one longitudinal edge of the substrate 1 (or of the optional substrate carrier 16) is inserted in a longitudinal groove 30 of an adjusting ledge 31 oriented along the length of the frame 17. The opposite longitudinal edge 18 is held, for example, in a claw 32 of a leaf-type compression spring 33. Adjustment is effected with the aid of a plurality of adjusting screws 34 provided along a longitudinal edge of the substrate 1 and bearing on the adjusting ledge 31, at least two of which are preferably arranged in the vicinity of the ends of the substrate 1. With such an adjustable mounting arrangement for the substrate 1, no carrier 16 is required.

Since it is not practical to manufacture a substrate 1 having an arbitrarily long length and since for printing a line of a DIN A 4 page, the (output) line of light should have a length of at least 18 to 20 centimeters, several such substrates 1 are arranged next to each other, with two compression springs 33 and two adjusting screws 34 as well as one adjusting ledge 31 being provided for each individual substrate 1.

These adjusting ledges 31 are preferably made from an elastic material such as a suitable plastic and, preferably, several adjusting ledges 31 are integrally formed as one common ledge indented in the region of the butt joint between two adjacent substrates 1, so that there will result several easily movable partial ledges flexibly joined to one another, with the length of each such partial ledge 31 approximately corresponding to that of a single substrate 1.

Figure 9:
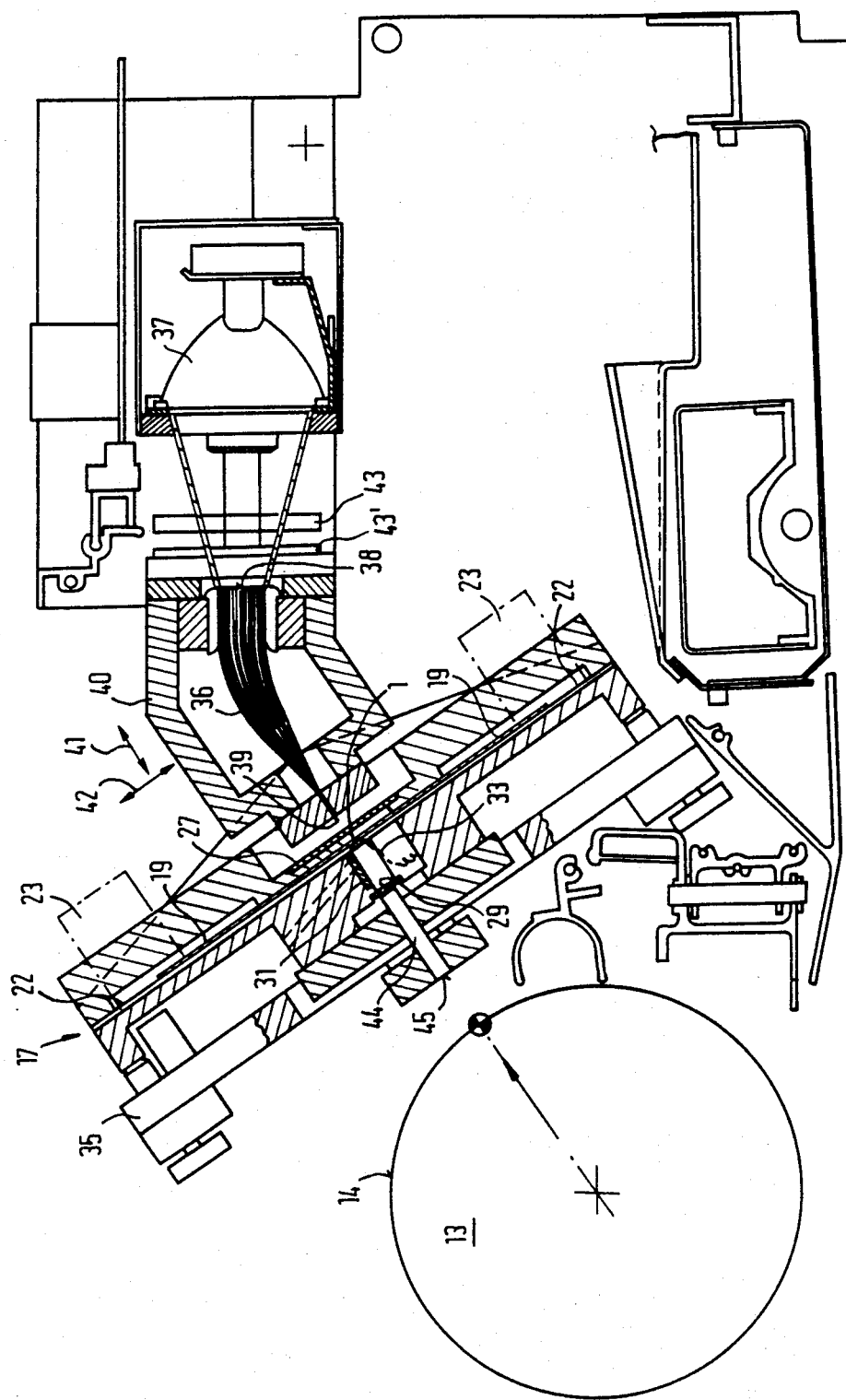
FIG. 9 shows the printing head of FIG. 8 installed in a printer employing a light-shape converter.

A printer constructed according to the invention and employing the above-described electro-optical device is shown in FIG. 9. The frame 17 is arranged in this case on a support 35. Above the first polarization filter 27, there is provided a light-shape converter 36 for converting the shape of the circular bundle of light rays coming from a light source 37 and impinging upon the circular input surface 38 of the light-shape converter 36 into a line of light 39. This light-shape converter is shown in greater detail in FIGS. 10 and 11, which show graphically how the circular input face 38 is transformed into a line of light 39. The light-shape converter may consist of an injection-molded part of transparent plastic; however, it preferably contains a suitably shaped bundle of glass fibers, which will have low transmission losses and which may be exposed to higher temperatures than an injection-molded plastic part.

The light-shape converter 36 is accommodated inside a housing 40. This housing is capable of being adjustably aligned with the aid of suitable mechanical components, both in the direction of the polarization filter 27 and the substrate 1 and transversely (arrows 41, 42, FIG. 9). By this means it can be aligned exactly parallel in relation to the substrate 1 and the substrate's broken lines 5, 6. By axial displacement in the direction as indicated by the arrow 41, the transmitted light intensity can also be varied. A suitable adjustable positioning arrangement will be described hereinafter with reference to FIG. 13.

As can be seen from FIG. 9, at least one heat-absorbing filter 43 is arranged between the light source and the input face 38. In addition thereto, filters 43' may be provided, which only permit the desired wavelength to pass (or a desired range of wavelength) to which, for example, the light-sensitive layer 14 of the carrier drum 13 reacts particularly favorably.

Below the second polarization filter 29 there is arranged a fiber optics collimating unit 44 arranged at a small spacing from the output face 45. This unit serves to rectify the light rays that are controllably transmitted through a particular area 4 to form a parallel, highly collimated pencil of rays which impinge upon the layer 14 of the carrier drum 13 to form a sharply focused point of light.

FIG. 12 shows the fiber optics collimating unit 44 schematically in a perspective representation. It consists substantially of a supporting framework 46 with optical fiber rods 47 arranged therein to extend parallel in relation to one another. The rods 47 are staggered with respect to one another in such a way that the input faces 45' and the output faces 45 are arranged in the same pattern as the areas 4 of the substrate 1. The optical fiber rods 47 preferably are formed from so-called gradient fibers which, as the result of doping or a suitable heat treatment in a special atmosphere, have a refractive index continuously decreasing from the inside towards the outside. Of course, it is also possible to use optical fiber rods having a stepwise changing index of refraction.

A cross slide suitable for adjusting the light-shape converter 36 is shown in FIG. 13. The light-shape converter 36 is secured in position with the aid of two such cross slides arranged either side of the longitudinal (output) end of the housing 40. Each such cross slide consists of a shaft 48 provided with a fine-pitch thread 49 on which a knurled wheel is adjustable. The shaft 48 is rigidly connected, for example, to the frame 17. Over the shaft 48 there is provided a guide block 51, the lower part of which is provided with a slot 52 whose width corresponds to the thickness of the knurled wheel 50. In the vertical pillar 53 of the guide block 51, there is provided a guide groove 54 containing a threaded bolt 55 over which a helical compression spring 56 is slipped. An adjusting block 57 is adapted to be installed thereon, with a corresponding opening 58 being provided in the guide portion 59. The adjusting block 57 is capable of being fixed in position by means of an adjusting nut 60. The housing 40 of the light-shape converter 36 is mounted to the adjusting block 57. By turning the knurled wheel 50, each end of the housing 40 can be transversely adjusted in the direction as indicated by the arrow 42, and, by turning the adjusting nut 60, in the axial direction as indicated by the arrow 41. With the aid of the two cross slides provided for at the longitudinal ends of the housing 40 (FIG. 9), it is thus possible to achieve an exact parallel alignment of the line of light 39 (FIG. 10) in relation to the partial lines 5, 6 of the substrate 1.

What is claimed is:

1. In an electro-optical device comprising an electrically controllable electro-optical substrate made from a transparent electro-optical material exhibiting an optical effect controllable by applying a voltage between first and second control electrodes arranged proximate to each other on a first side of said substrate to thereby define a plurality of areas of the substrate to be controlled:

an additional electrode lying on a second side of said substrate and adjacent to said plurality of areas, said additional electrode defining a window-like opening for each of said areas, with said areas and corresponding window-like openings arranged in two rows that are staggered with respect to each other and wherein the projection of one of said rows of openings on the other in overlapping relationship defines a continuous region;

said first electrode being strip shaped and disposed between said two rows, and said second electrode being one of a plurality of second electrodes spaced from one another along each of two rows that lie on opposite sides of said center electrode; and a plurality of terminal contacts, each connected to one of said second electrode portions and extending outwardly in relation to said first side of said substrate, said terminal contacts being arranged in a stepwise fashion.

2. In an electro-optical device comprising an electrically controllable electro-optical substrate made from a transparent electro-optical material exhibiting an optical effect controllable by applying a voltage between first and second control electrodes that are separated by a light passing window area between them, said electrodes arranged on a first side of said substrate to thereby control the voltage field near said first side of the substrate in said window area, the improvement comprising:

an additional electrode on a second side of said substrate, said additional electrode having openings so that it lies around said window area of the substrate; and means for applying a first voltage difference between said first and second electrodes and for applying a second voltage between said first and said additional electrodes, whereby to establish largely perpendicular interacting electric fields that can reinforce or reduce the net change in optical characteristics of the substrate for light passing through said window area.

3. The improvement described in claim 2 wherein:

said control electrodes form a plurality of spaced pairs of control electrode portions at spaced locations along said first side of said substrate, each pair of said control electrode portions forming part of a boundary of a different window area therebetween, said window areas arranged in a row; and wherein said additional electrode on said second side of the substrate substantially completely surrounds each of said window areas.

4. The improvement described in claim 2, wherein:

said window areas are arranged along two imaginary lines, with the window areas along the two lines staggered, and including means for directing light through each of said staggered rows of window areas onto staggered areas along a strip-shaped area on an object, said window areas arranged so that substantially all areas along said strip-shaped area are illuminated.

5. Apparatus for using electricity to control the passage of light through each of a multiplicity of window areas, comprising:

an electrically controllable electro-optic substrate with first and second opposite faces, and having a row of window areas through which light can pass between said opposite faces;

a first substantially opaque electrode extending on the first face of said substrate beside and along said row of window areas;

a plurality of second substantially opaque electrodes on said first substrate face, each lying beside a different one of said window areas but spaced from said first electrode;

means for directing light through said window areas;

means for applying a first voltage between each of said second electrodes and said first electrode, to control light passing through said window areas; and a third substantially opaque electrode lying on said second face of said substrate at locations adjacent to each of said window areas of said row;

wherein said voltage applying means for applying a voltage difference between said first and second electrodes, also applies a voltage difference between one of said electrodes that lies on said first face of said substrate and said third electrode.

* * * * *